United States Patent
Baset et al.

(10) Patent No.: US 9,015,713 B2
(45) Date of Patent: Apr. 21, 2015

(54) FACILITATING CUSTOMER-INITIATED VIRTUAL MACHINE MIGRATION AND SWAPPING

(75) Inventors: Salman A. Baset, New York, NY (US);
Hai Huang, White Plains, NY (US);
Kyung Hwa Kim, New York, NY (US);
Chunqiang Tang, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 275 days.

(21) Appl. No.: 13/585,084

(22) Filed: Aug. 14, 2012

(65) Prior Publication Data
US 2014/0040892 A1 Feb. 6, 2014

Related U.S. Application Data

(63) Continuation of application No. 13/566,099, filed on Aug. 3, 2012.

(51) Int. Cl.
*G06F 9/455* (2006.01)
*G06F 9/46* (2006.01)

(52) U.S. Cl.
CPC ............ *G06F 9/45533* (2013.01); *G06F 9/455* (2013.01); *G06F 9/45558* (2013.01); *G06F 2009/4557* (2013.01)

(58) Field of Classification Search
None
See application file for complete search history.

(56) References Cited

U.S. PATENT DOCUMENTS

| 8,352,942 | B2 * | 1/2013 | Shimogawa | ....................... 718/1 |
| 2005/0251802 | A1 * | 11/2005 | Bozek et al. | ....................... 718/1 |
| 2010/0293146 | A1 * | 11/2010 | Bonnet et al. | .................. 707/640 |
| 2011/0179415 | A1 * | 7/2011 | Donnellan et al. | ................. 718/1 |
| 2011/0213886 | A1 | 9/2011 | Kelkar et al. | |
| 2011/0225277 | A1 | 9/2011 | Freimuth et al. | |
| 2011/0258634 | A1 | 10/2011 | Bonilla et al. | |

(Continued)

FOREIGN PATENT DOCUMENTS

WO 2011123467 A1 10/2011

OTHER PUBLICATIONS

Haselhorst et al., "Efficient Storage Synchronization for LiveMigration in Cloud Infrastructures," 2011 19th International Euromicro Conference on Parallel, Distributed and Network-Based Processing.

(Continued)

*Primary Examiner* — Lewis A Bullock, Jr.
*Assistant Examiner* — Jacob Dascomb
(74) *Attorney, Agent, or Firm* — Ryan, Mason & Lewis, LLP

(57) ABSTRACT

A system and an article of manufacture for facilitating customer-initiated virtual machine (VM) migration and swapping include obtaining documentation of at least one performance parameter of two or more virtual machines running on two or more physical machines, obtaining a request for a virtual machine exchange from a user of a first virtual machine, wherein the request comprises a preference for at least one desired performance parameter in at least one additional virtual machine, matching the request from the user of the first virtual machine with at least one additional virtual machine that includes the at to least one desired performance parameter without assistance from a cloud provider, and exchanging the first virtual machine with a virtual machine from the at least one additional virtual machine that includes the at least one desired performance parameter.

19 Claims, 3 Drawing Sheets

(56) References Cited

U.S. PATENT DOCUMENTS

| | | | |
|---|---|---|---|
| 2011/0265147 A1 | 10/2011 | Liu | |
| 2011/0265168 A1 | 10/2011 | Lucovsky et al. | |
| 2012/0311576 A1* | 12/2012 | Shu et al. | 718/1 |
| 2013/0014103 A1* | 1/2013 | Reuther et al. | 718/1 |
| 2013/0055250 A1* | 2/2013 | Pechanec et al. | 718/1 |

OTHER PUBLICATIONS

Okuda et al., "A Remote Swap Management Framework in a Virtual Machine Cluster," 2010 IEEE 3rd International Conference on Cloud Computing.

Newhall et al., "Nswap: A Network Swapping Module for Linux Clusters," Europar '03 International Conference on Parallel and Distributed Computing, Aug. 2003.

Chen et al., "An Efficient Resource Management System for On-line Virtual Cluster Provision," 2009 IEEE International Conference on Cloud Computing.

Xiang et al., "VMDriver: A Driver-based Monitoring Mechanism for Virtualization," 2010 29th IEEE International Symposium on Reliable Distributed Systems.

Amazon AWS Forum Posting. https://forums.aws.amazon.com/message.jspa?messageID=162083. [Online; accessed Jul. 2011].

Amazon ec2 pricing. http://aws.amazon.com/ec2/pricing/. [Online; accessed Jul. 2011].

Rackspace. http://www.rackspace.com. [Online; accessed Jul. 2011].

VMware vMotion. http://www.vmware.com/products/vmotion/overview.html. [Online; accessed Jul. 2011].

Amazon EC2 SLA. https://aws.amazon.com/ec2-sla/. [Online; accessed Jan. 2012].

Rackspace Cloud Servers SLA. http://www.rackspace.com/cloud/legal/sla/. [Online; accessed Jan. 2012].

Windows Azure Compute SLA. https://www.microsoft.com/download/en/details.aspx?displaylang=en&id=24434. [Online; accessed Jan. 2012].

Barker et al. Empirical evaluation of latency-sensitive application performance in the cloud. In Proceedings of ACM MMSys (2010).

Bobroff et al. Dynamic placement of virtual machines for managing sla violations. In Proceedings of IM (2007).

Hyser et al. Autonomic Virtual Machine Placement in the Data Center. In HPL-2007-189 (2008), HPL-2007-189.

Meng et al. Improving the scalability of data center networks with traffic-aware virtual machine placement. (Dec. 2010).

Schad et al. Runtime measurements in the cloud: observing, analyzing, and reducing variance. In Proceedings of VLDB Endow. (Sep. 2010).

Tang, C., Steinder, M., Spreitzer, M., and Pacifici, G. A scalable application placement controller for enterprise data centers. In Proceedings of the WWW (New York, NY, USA, 2007).

* cited by examiner

FACILITATING CUSTOMER-INITIATED VIRTUAL MACHINE MIGRATION AND SWAPPING

CROSS-REFERENCE TO RELATED APPLICATIONS

This application is a continuation of U.S. patent application Ser. No. 13/566,099 filed Aug. 3, 2012, and incorporated by reference herein.

FIELD OF THE INVENTION

Embodiments of the invention generally relate to information technology, and, more particularly, to virtual machine migration and provisioning.

BACKGROUND

In Infrastructure-as-a-Service (IaaS) cloud service model, users can obtain on-demand resources by rapid provisioning of virtual machines (VMs). VMs of one user are typically co-located with VMs of another user on a physical host, especially in a public cloud. Each identically configured VM is expected to receive similar performance for central processing unit (CPU), memory, disk input/output (I/O), and network bandwidth regardless of its location in the cloud (that is, the physical machine on which the VM is placed). However, such services do not necessarily provide performance guarantees. In practice, the performance of a VM depends on the underlying hardware, how the hardware is configured, and the amount of shared resources consumed by its co-located virtual machines. As workloads have different resource requirements, it is possible that an insufficient host for one VM can be sufficient for another VM, and swapping the locations of the two VMs may even improve the performance (or other metrics) of both VMs. However, in existing approaches, cloud providers do not offer a VM swapping service.

SUMMARY

In one aspect of the present invention, techniques for facilitating customer-initiated virtual machine (VM) migration and swapping are provided. An exemplary computer-implemented method for exchanging two or more virtual machines can include steps of obtaining documentation of at least one performance parameter of two or more virtual machines running on two or more physical machines, obtaining a request for a virtual machine exchange from a user of a first virtual machine, wherein the request comprises a preference for at least one desired performance parameter in at least one additional virtual machine, matching the request from the user of the first virtual machine with at least one additional virtual machine that includes the at least one desired performance parameter without assistance from a cloud provider, and exchanging the first virtual machine with a virtual machine from the at least one additional virtual machine that includes the at least one desired performance parameter.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and operative to perform noted method steps. Yet further, another aspect of the invention or elements thereof can be implemented in the form of means for carrying out the method steps described herein, or elements thereof; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Figure 1:
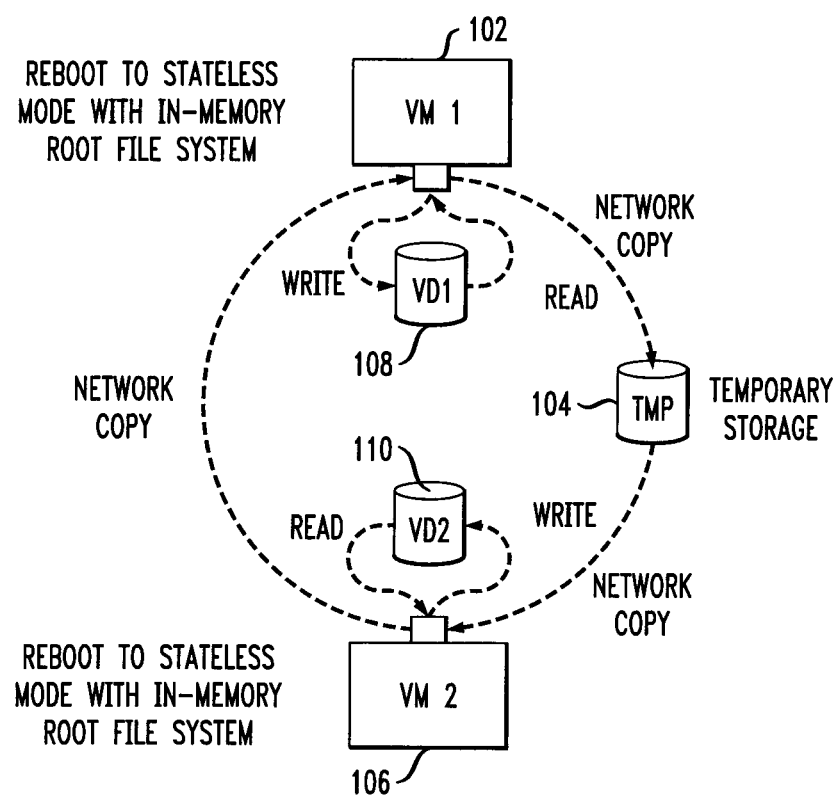
FIG. 1 is a diagram illustrating techniques for swapping two virtual machines, according to an embodiment of the present invention.

As described herein, an aspect of the present invention includes swapping virtual machines without cloud provider assistance. At least one embodiment of the invention includes a cloud provider-agnostic method in which a customer or different customers running two or more virtual machines (VMs) in a cloud environment can agree to swap the VMs based on an assessment of whether the new location(s) better serves the needs of workloads running in those virtual machines.

Accordingly, the techniques detailed herein leverage performance differences among identically or near-identically provisioned VMs that may be hosted within the same cloud provider or different cloud providers in a provider agnostic manner. As noted, because applications running in VMs are different, their respective needs are not identical and can also vary with time. For example, some VM workloads may be CPU-intensive while others may be more network or disk intensive. The difference in resource requirements of VMs due to varying workloads imply that, at any moment in time, an insufficient physical host for one VM may in fact be a sufficient physical host for another VM. Consequently, the performance (or any metric) of both VMs can be improved by swapping the physical hosts of two VMs.

Accordingly, as described herein, at least one embodiment of the invention includes distributed agents that run on VMs interested in leveraging performance differences, as well as a centralized broker. The VM agents utilize the centralized broker to discover other VM agents and communicate with the other VM agents to determine the existence of performance differences by running micro-benchmarks. Additionally, the broker facilitates performance of a swap of physical hosts without any cloud provider assistance. In at least one embodiment of the invention, the broker is run by a party that users of both VMs trust.

As described in accordance with embodiments of the invention, there are multiple ways of moving virtual machines across physical hosts. One technique is provider-assisted migration. Such an approach includes live or offline migration of VMs with the assistance of a cloud provider(s). However, this mechanism may not be preferred because it requires exposing the underlying physical infrastructure and a (partial) hypervisor-level control to the customer, which may not be desirable from the cloud provider's perspective.

Another technique for moving virtual machines across physical hosts includes provisioning a large number of virtual machines, measuring their performance, selecting the most desirable performing ones and decommissioning the rest (that is, those that are not selected). However, this approach also may not be preferred for one of multiple reasons. For example, the result is largely dependent on where new virtual machines are provisioned (for example, the lack of randomness in a placement algorithm can yield poor result). Also, the cost of provisioning a large number of virtual machines can be prohibitive, and in a highly utilized environment, location of the newly provisioned virtual machines can be constrained. Additionally, the performance of VMs varies as workloads running in co-located VMs may change.

FIG. 1 is a diagram illustrating techniques for swapping two virtual machines, according to an embodiment of the present invention. As depicted in FIG. 1, another technique for moving virtual machines across physical hosts includes swapping the locations between two consenting virtual machines after incentives have been negotiated and accepted by both VMs.

Similar to migration, swapping two virtual machines can be carried out if hypervisor-level control is acquired, and "live swapping" is not difficult to emulate. Without a provider's assistance, however, it is also possible to swap two virtual machines in a secure manner, as detailed in accordance with at least one embodiment of the invention. As depicted in FIG. 1, swapping two virtual machines, VM1 (102) and VM2 (106), essentially includes swapping the respective persistent storage of each VM. That is, when VM1 boots from a disk partition that contains VM2's data and vice versa, VM1 and VM2, for all practical purposes, have exchanged locations. Swapping two disk images, VD1 (108) and VD2 (110), can be done through a temporary storage 104. Swapping two virtual machines via a shared storage 104 includes the following steps.

Initially, VM1 (102) and VM2 (106) are re-booted to a stateless mode. Data is read from virtual disk 1 (108), and VD1 (108) content is written to the shared storage 104. Data is read from virtual disk 2 (106), VD2 110 content is sent from VM2 106 to VM1 102, and VD2 110 content is written to VM1's 102 persistent storage. Further, VD1 108 content is read from the shared storage 104 and written to VM2's 106 persistent storage.

To maintain disk image fidelity, file system level copy may not be sufficient. It may be necessary to perform block-level copy to preserve disk meta-data and data layout. Additionally, before a disk partition can be copied, the disk needs to be in a quiescent state (that is, not mounted). Accordingly, at least one embodiment of the invention includes rebooting the disk's virtual machine in a stateless mode from a random access memory (RAM) disk (initrd). An agent within the RAM disk can copy the content from the un-mounted disk partition to the designated shared storage area (104) via an internet protocol (IP) network or a storage area network (SAN).

When the two virtual machines restart, the respective original workload of each will now run in new locations. The VMs running in the new location use the IP addresses of the VMs that were previously running in that location; otherwise, network connectivity will no longer work. Further, the ownership of the swapped VMs is transferred using a broker so that users cannot inadvertently access each other's VMs.

Figure 2:
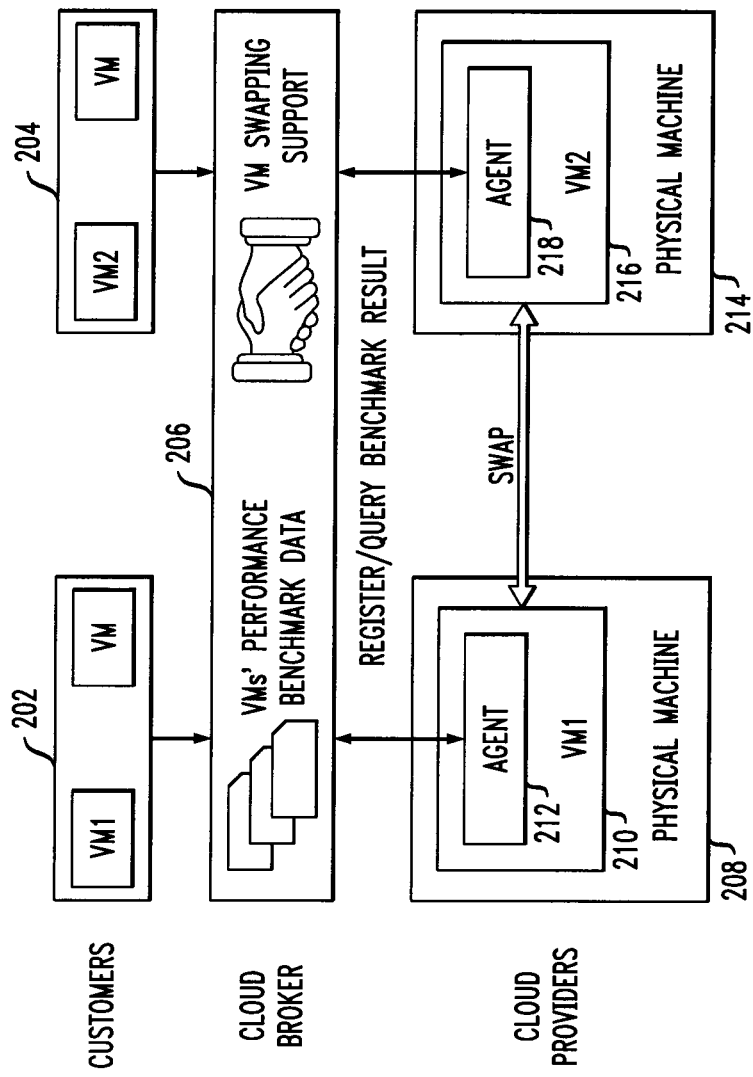
FIG. 2 is a diagram illustrating example system architecture, according to an embodiment of the present invention.

FIG. 2 is a diagram illustrating example system architecture, according to an embodiment of the present invention. As detailed herein, embodiments of the invention include providing a framework that enables VMs to exchange performance information. Such framework includes customer VMs (such as VM 202 and VM 204) and a broker 206 service, wherein the broker 206 is a central server trusted by VMs that maintains the list of all agents participating in the exchange network.

In order to participate in the VM swapping to improve performance, an agent running on a VM (such as agent 212 running on VM 210 on physical machine 208, or agent 218 running on VM 216 on physical machine 214) registers itself with the broker 206, and stores its network address, instance specification (that is, provisioned CPU), memory, disk, network, and usage of above resources (for example, CPU utilization, disk throughput). The broker 206 stores this information in an internal database and provides access to the database when agents query for matching VMs (based on desired performance parameters).

By way of example, consider a VM that is experiencing sufficient CPU performance but mediocre disk and network performance. The VM agent (such as agent 212 or 218) queries the broker 206 for other VMs with sufficient disk and network performance and advertises itself (that is, its VM) as having sufficient CPU performance. The broker 206 finds a list of suitable candidate VMs and returns related information to the querying VM. The broker 206 can return the complete set of VMs matching the query if it is not too large, or the broker 206 can also return a subset based on suitable criteria (for example, fairness, load distribution).

Additionally, the information pertaining to VM performance can potentially become stale because the performance of each VM changes over time. Second, an application running on a VM may have a specific performance requirement which can only be determined by running an application specific micro-benchmark. Therefore, at least one embodiment of the invention including running an application-specific micro-benchmark to more precisely gauge performance of the VM.

The user of the probing VM (such as VM 202 or VM 204) defines a set of micro-benchmarks to gauge performance of other VMs in order to determine their suitability for a potential swap. The micro-benchmarks can measure multiple properties such as, for example, CPU, memory, network latency (round trip time (RTT) between two VMs), or network bandwidth. To evaluate the CPU performance, an agent measures the elapsed time required to execute a pre-defined function that contains a cpu-intensive calculation. Similarly, an agent can run micro-benchmarks to gauge the disk and network throughput.

The probing agent requests the agents running on VMs being probed to run these micro-benchmarks, and additionally passes the relevant executable of the benchmark because for instance, the agent does not trust the user-supplied micro benchmarks. To protect against malicious code, the micro-benchmarks can be run in a sandbox. Examples of such sandboxes include Linux containers or a Java-like virtual machine (JVM). Alternatively, the applications can submit their micro-benchmarks to the broker. Additionally, the VMs will run the benchmarks that have been cryptographically signed by the broker. After running the micro-benchmarks, the probed agents return the result to the probing agent.

Once the probing agent finds a list of suitable VMs, the agent sends a swap request to the VMs on the list. The agents running on VMs being probed must also ascertain the performance of a probing agent by requesting the agent to run micro-benchmarks specific to their applications. The agreeing agents can then document the agreement and initiate the swap process, as described herein.

Additionally, at least one embodiment of the invention includes verifying the results of the micro-benchmark process. By way of example, instead of rebooting a VM from any RAM disk, a VM can be rebooted from a remote disk that is under the control of the broker. In this way, a broker can prohibit users from accessing their VMs temporarily, and the broker can execute the benchmarks and verify the results reported by the agents. Accordingly, because users cannot manipulate the remote disk under broker control, the benchmark results are trustworthy.

As detailed herein, a broker represents a trusted service, and to ensure authenticity of a transaction, various agents are dispatched onto VMs that are to be potentially swapped. Agents are programs or scripts that are secure and have low-overhead. Additionally, the price of a VM location can vary from time to time and is driven by supply and demand, but it is also a function of the standard rate that cloud providers set. By way of illustration, consider the following example scenario of VM bidding.

A customer who is willing to swap his VM location registers with the broker and sets a desired price. Another customer who wants to find a better or more sufficient location for his/her VMs can query the broker with a set of desired features. If there is a match and price of the discovered match is below the buyer's budget, a swapping request is sent to the broker to initiate the swapping operation and related financial transactions. Also, because it is possible that there are multiple buyers, a simple bidding system can facilitate the process.

In a cloud, a VM is owned by the user who initially creates the VM. As detailed herein, at least one embodiment of the invention includes swapping the contents of two (or more) VMs, but without changing the ownership of the VMs perceived by the cloud management system. This, without additional corresponding action, can potentially cause several issues. For example, the usage of a VM would be incorrectly billed to its original user rather than its current user. Also, even if the original user cannot log into the VM, he or she still has control over the VM by using the cloud's management tool (for example, to take a snapshot of the VM's disk image and gain access to its data, which becomes a security breach).

Accordingly, in at least one embodiment of the invention, after two (or more) VMs are swapped, the ownership of the VM is transferred to its new user so that the previous/original user no longer has control over the VM. This can be achieved in multiple ways. For example, the cloud service provider may provide a public service to transfer the ownership of a VM from one user to another user. Alternatively, this capability may be offered by a third party (broker) that provides value-add services on top of one or more public clouds. The third party can offer its own layer of VM ownership management and allow VM ownership transfer between its customers.

Figure 3:
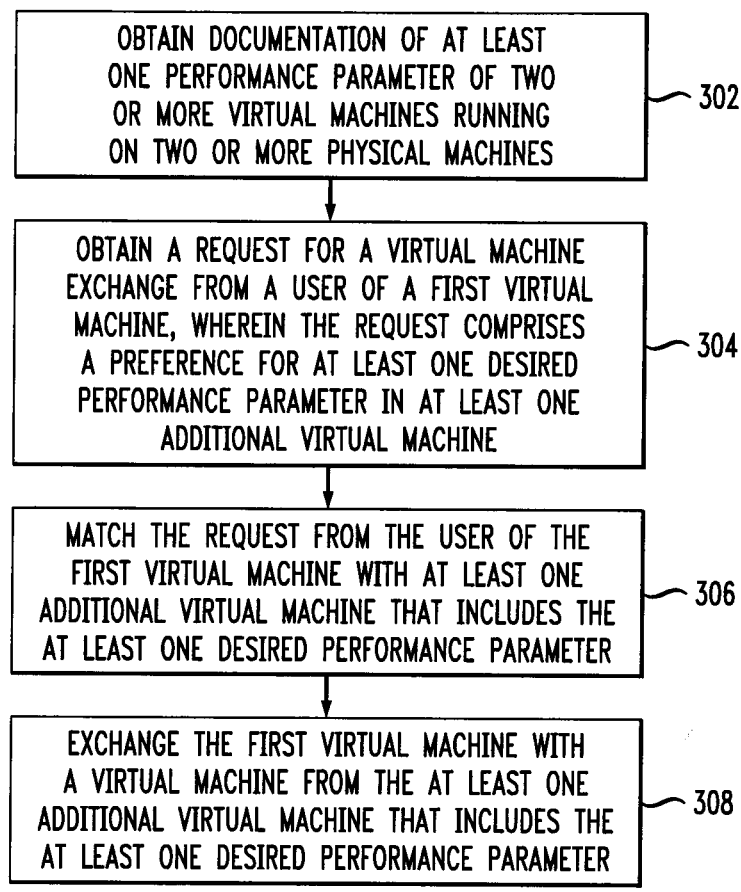
FIG. 3 is a flow diagram illustrating techniques for exchanging two or more virtual machines, according to an embodiment of the invention.

FIG. 3 is a flow diagram illustrating techniques for exchanging two or more virtual machines running on two or more physical machines, according to an embodiment of the invention. Step 302 includes obtaining documentation of at least one performance parameter of two or more virtual machines running on two or more physical machines.

Step 304 includes obtaining a request for a virtual machine exchange from a user of a first virtual machine, wherein the request comprises a preference for at least one desired performance parameter in at least one additional virtual machine. The performance parameter can include, for example, central processing unit, memory, network, storage, and/or number of hops between virtual machines.

Step 306 includes matching the request from the user of the first virtual machine with at least one additional virtual machine that includes the at least one desired performance parameter without assistance from a cloud provider.

Step 308 includes exchanging the first virtual machine with a virtual machine from the at least one additional virtual machine that includes the at least one desired performance parameter. Exchanging can include starting the first virtual machine and the virtual machine from the at least one additional virtual machine in a stateless mode with each corresponding boot disk being unmounted, and copying each used disk block from the first virtual machine to a temporary storage. Exchanging can additionally include copying the contents of the virtual machine from the at least one additional virtual machine to a storage component of the first virtual machine, and copying the contents of the first virtual machine from the temporary storage to a disk of the virtual machine from the at least one additional virtual machine.

The techniques depicted in FIG. 3 can additionally include obtaining a second request for a virtual machine exchange from a user of a second virtual machine, wherein the request includes a preference for at least one desired performance parameter in at least one additional virtual machine. Additionally, at least one embodiment of the invention includes matching the first request from the user of the first virtual machine with the second request from the user of the second virtual machine if the first virtual machine includes the at least one desired performance parameter from the second request and the second virtual machine includes the at least one desired performance parameter from the first request. Accordingly, exchanging the first virtual machine is then exchanged with the second virtual machine subsequent to obtaining assent from the first user and the second user for the exchange.

As detailed herein, in at least one embodiment of the invention, the exchanging step includes using a third party broker. By way of example, the broker obtains assent from the user of the first virtual machine and the user of the virtual machine from the at least one additional virtual machine for said exchanging. Further, the broker revokes user access to the first virtual machine and the virtual machine from the at least one additional virtual machine, and shuts down the first virtual machine and the virtual machine from the at least one additional virtual machine. Additionally, in at least one embodiment of the invention, the broker attaches a remote disk to each virtual machine, sets the remote disks as boot, and unmounts each virtual machine disk. Also, the broker can restart each virtual machine, swap the virtual machine disks using an intermediary storage controlled by broker, remove the remote disks, and restore the newly copied disks on the virtual machine disks and rebooting the virtual machines.

The techniques depicted in FIG. 3 can additionally include verifying the documentation of the at least one performance parameter of the two or more virtual machines by running at least one micro-benchmark of each virtual machine for comparison with the documentation. Further, at least one embodiment of the invention includes exchanging ownership of the first virtual machine and the virtual machine from the at least one additional virtual machine in connection with exchanging the first virtual machine with the virtual machine from the at least one additional virtual machine.

The techniques depicted in FIG. 3 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an aspect of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 3 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in a computer readable medium having computer readable program code embodied thereon.

An aspect of the invention or elements thereof can be implemented in the form of an apparatus including a memory and at least one processor that is coupled to the memory and operative to perform exemplary method steps.

Figure 4:
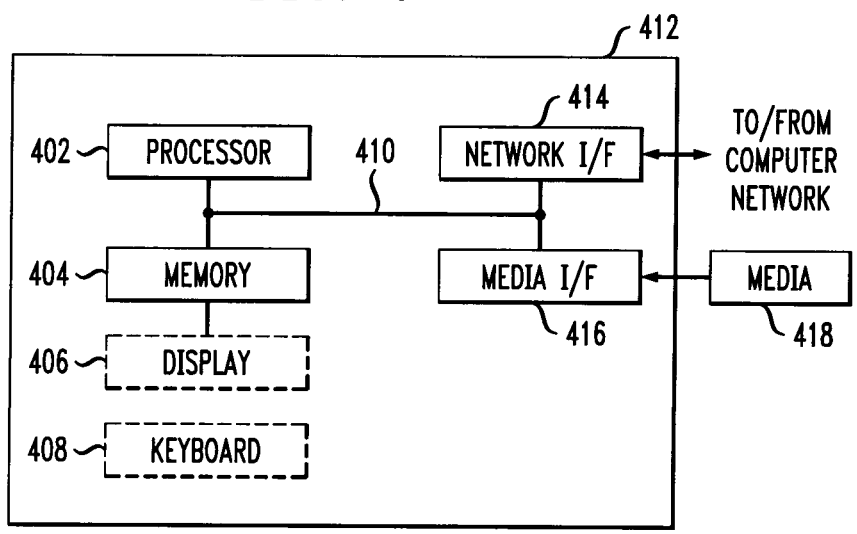
FIG. 4 is a system diagram of an exemplary computer system on which at least one embodiment of the invention can be implemented.

Additionally, an aspect of the present invention can make use of software running on a general purpose computer or workstation. With reference to FIG. 4, such an implementation might employ, for example, a processor 402, a memory 404, and an input/output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 402, memory 404, and input/output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 402 coupled directly or indirectly to memory elements 404 through a system bus 410. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 412 as shown in FIG. 4) running a server program. It will be understood that such a physical server may or may not include a display and keyboard.

As noted, aspects of the present invention may take the form of a computer program product embodied in a computer readable medium having computer readable program code embodied thereon. Also, any combination of computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of at least one programming language, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, an aspect of the invention includes an article of manufacture tangibly embodying computer readable instructions which, when implemented, cause a computer to carry out a plurality of method steps as described herein.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 402. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed.

At least one aspect of the present invention may provide a beneficial effect such as, for example, migration with multiple cloud environments and trusted third parties.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An article of manufacture comprising a non-transitory computer readable storage medium having computer readable instructions tangibly embodied thereon which, when implemented, cause a computer to carry out a plurality of method steps comprising:
   obtaining documentation of at least one performance parameter of two or more virtual machines each running on a respective physical machine;
   obtaining:
   (i) a first request for a virtual machine exchange from a user of a first virtual machine, wherein the first request comprises a preference for at least one desired virtual machine performance parameter; and
   (ii) a second request for a virtual machine exchange from a user of a second virtual machine, wherein the second request comprises a preference for at least one desired virtual machine performance parameter;
   matching the first request with the second request upon determining that: (i) the first virtual machine includes the at least one desired virtual machine performance parameter from the second request, and (ii) the second virtual machine includes the at least one desired virtual machine performance parameter from the first request; and
   exchanging the first virtual machine with the second virtual machine based upon matching the first request with the second request and without assistance from a cloud provider, wherein said exchanging comprises:
   re-booting each of the first virtual machine and the second virtual machine to a stateless mode;
   reading one or more items of data from the first virtual machine;
   writing the one or more items of data from the first virtual machine to a shared storage component;
   reading one or more items of data from the second virtual machine;
   writing the one or more items of data from the second virtual machine to a persistent storage component associated with the first virtual machine;
   reading the one or more items of data from the first virtual machine from the shared storage component; and
   writing the one or more items of data from the first virtual machine from the shared storage component to a persistent storage component associated with the second virtual machine;
   wherein at least one of the plurality of method steps is carried out by a computer device.

2. The article of manufacture of claim 1, wherein the method steps comprise:
   obtaining assent from the user of the first virtual machine and the user of the second virtual machine for said exchanging.

3. The article of manufacture of claim 1, wherein the at least one virtual machine performance parameter comprises central processing unit, memory, network, storage, and/or number of hops between virtual machines.

4. The article of manufacture of claim 1, wherein said exchanging comprises using a third party broker.

5. The article of manufacture of claim 4, wherein the method steps comprise:
   obtaining assent, via the third party broker, from the user of the first virtual machine and the user of the second virtual machine for said exchanging.

6. The article of manufacture of claim 4, wherein the method steps comprise:
   revoking, via the third party broker, user access to the first virtual machine and the second virtual machine; and
   shutting down, via the third party broker, the first virtual machine and the second virtual machine.

7. The article of manufacture of claim 6, wherein the method steps comprise:
   attaching, via the third party broker, a remote disk to each virtual machine;
   setting, via the third party broker, the remote disks as boot; and
   unmounting, via the third party broker, each of one or more virtual machine disks.

8. The article of manufacture of claim 7, wherein the method steps comprise:
   restarting, via the third party broker, each virtual machine; and
   swapping, via the third party broker, the virtual machine disks using an intermediary storage controlled by the third party broker.

9. The article of manufacture of claim 8, wherein the method steps comprise:
   removing, via the third party broker, the remote disks; and
   restoring, via the third party broker, one or more newly copied disks on the virtual machine disks and rebooting the virtual machines.

10. The article of manufacture of claim 1, wherein the method steps comprise:
    verifying the documentation of the at least one virtual machine performance parameter of the two or more virtual machines, wherein said verifying comprises running at least one micro-benchmark of each virtual machine for comparison with the documentation.

11. The article of manufacture of claim 1 wherein the method steps comprise:
    exchanging ownership of the first virtual machine and the second virtual machine in connection with exchanging the first virtual machine with the second virtual machine.

12. A system for exchanging two or more virtual machines, comprising:
    at least one distinct software module, each distinct software module being embodied on a tangible computer-readable medium;
    a memory; and
    at least one processor coupled to the memory and operative to:
    obtain documentation of at least one performance parameter of two or more virtual machines each running on a respective physical machine;
    obtain:
    (i) a first request for a virtual machine exchange from a user of a first virtual machine, wherein the first request comprises a preference for at least one desired virtual machine performance parameter; and
    (ii) a second request for a virtual machine exchange from a user of a second virtual machine, wherein the second request comprises a preference for at least one desired virtual machine performance parameter;

match the first request with the second request upon determining that: (i) the first virtual machine includes the at least one desired virtual machine performance parameter from the second request, and (ii) the second virtual machine includes the at least one desired virtual machine performance parameter from the first request; and exchange the first virtual machine with the second virtual machine based upon matching of the first request with the second request and without assistance from a cloud provider, wherein said exchanging comprises:

re-booting each of the first virtual machine and the second virtual machine to a stateless mode;

reading one or more items of data from the first virtual machine;

writing the one or more items of data from the first virtual machine to a shared storage component;

reading one or more items of data from the second virtual machine;

writing the one or more items of data from the second virtual machine to a persistent storage component associated with the first virtual machine;

reading the one or more items of data from the first virtual machine from the shared storage component; and writing the one or more items of data from the first virtual machine from the shared storage component to a persistent storage component associated with the second virtual machine.

13. A method for exchanging two or more virtual machines running on two or more physical machines, the method comprising steps of:

obtaining documentation of at least one performance parameter of two or more virtual machines each running on a respective physical machine;

obtaining:
(i) a first request for a virtual machine exchange from a user of a first virtual machine, wherein the first request comprises a preference for at least one desired virtual machine performance parameter; and
(ii) a second request for a virtual machine exchange from a user of a second virtual machine, wherein the second request comprises a preference for at least one desired virtual machine performance parameter;

matching the first request with the second request upon determining that: (i) the first virtual machine includes the at least one desired virtual machine performance parameter from the second request, and (ii) the second virtual machine includes the at least one desired virtual machine performance parameter from the first request; and exchanging the first virtual machine with the second virtual machine based upon matching the first request with the second request and without assistance from a cloud provider, wherein said exchanging comprises:

re-booting each of the first virtual machine and the second virtual machine to a stateless mode;

reading one or more items of data from the first virtual machine;

writing the one or more items of data from the first virtual machine to a shared storage component;

reading one or more items of data from the second virtual machine;

writing the one or more items of data from the second virtual machine to a persistent storage component associated with the first virtual machine;

reading the one or more items of data from the first virtual machine from the shared storage component; and writing the one or more items of data from the first virtual machine from the shared storage component to a persistent storage component associated with the second virtual machine;

wherein at least one of the steps is carried out by a computer device.

14. The method of claim 13, wherein said exchanging comprises using a third party broker.

15. The method of claim 14, comprising:
obtaining assent, via the third party broker, from the user of the first virtual machine and the user of the second virtual machine for said exchanging.

16. The method of claim 14, comprising:
revoking, via the third party broker, user access to the first virtual machine and the second virtual machine; and
shutting down, via the third party broker, the first virtual machine and the second virtual machine.

17. The method of claim 16, comprising:
attaching, via the third party broker, a remote disk to each virtual machine;
setting, via the third party broker, the remote disks as boot; and
unmounting, via the third party broker, each of one or more virtual machine disks.

18. The method of claim 17, comprising:
restarting, via the third party broker, each virtual machine; and
swapping, via the third party broker, the virtual machine disks using an intermediary storage controlled by the third party broker.

19. The method of claim 18, comprising:
removing, via the third party broker, the remote disks; and
restoring, via the third party broker, one or more newly copied disks on the virtual machine disks and rebooting the virtual machines.

* * * * *